United States Patent [19]

Slaiken

[11] Patent Number: 5,183,163
[45] Date of Patent: Feb. 2, 1993

[54] INTERLOCKING-CONTINUOUS BASE BOOKENDS

[76] Inventor: Stephen J. Slaiken, 9906 Woodlake Cove, Austin, Tex. 78733

[21] Appl. No.: 828,354

[22] Filed: Jan. 30, 1992

[51] Int. Cl.$^5$ .................................................. A47F 5/00
[52] U.S. Cl. ...................................... 211/43; 211/184
[58] Field of Search ................... 211/43, 184; 108/61

[56] References Cited

U.S. PATENT DOCUMENTS

| | | | |
|---|---|---|---|
| 1,750,575 | 3/1930 | Cubberley | 211/43 X |
| 1,750,576 | 3/1930 | Cubberley | 211/43 X |
| 3,425,565 | 2/1969 | Sprenger | 211/43 |
| 4,106,735 | 8/1978 | Partain et al. | 211/43 X |
| 4,874,099 | 10/1989 | Arnott et al. | 211/43 X |

Primary Examiner—Robert W. Gibson, Jr.

[57] ABSTRACT

A novel adjustable holder and support device for books, files, recorded music discs and the like comprised of two upright end units each with a longitudinal leg that extends under the materials being contained. In addition, an optional flat extender may be positioned between the two end units singly or in plurality. Said units in combination, hold the contained materials on an even plane above the surface upon which the holder rests, one unit leg having a female opening to receive the second unit's male-tongue leg. The two base legs interlock, when positioned, by means of a plurality of indexed shapes along the outside edge of the male unit tongue and the facing edges of the female unit's opening. This engagement thus allows for easy adjustability while insuring that the space allotted for containment is fixed against change while in use.

2 Claims, 2 Drawing Sheets

INTERLOCKING-CONTINUOUS BASE BOOKENDS

BACKGROUND OF THE INVENTION

1. Field of Invention

This invention relates to devices for containing bound volumes, and other materials, in such a way that the containment space is both adjustable and fixed. It is specifically a containing device that features an interlocking base mechanism which can be adjusted for width, and holds the contained materials above the plane upon which the device rests.

2. Description of the Prior Art

Heretofore, various devices have been used to confine items such as books, file folders, recorded music disks and other such items through the use of devices (known hereafter as "traditional bookends") such as heavy weights, a variety of opposing end units or even open sided slip-case boxes. Opposing end unit devices consist of upright panels that form a right angle to a base that may or may not partially extend under the materials being contained and usually extend out and away from the contained materials.

A disadvantage of traditional bookends is that while they may be adjusted in width, the adjustment is not fixed. The support surfaces attempt to retain the set position by means of skid resistant surfaces or the weight of the device, neither of which are truly resistant to change in the space allotted for containment.

Another disadvantage of traditional bookends is that the support surfaces extend out from the materials being contained and cause an unusable space on either side of the contained space as in the case of the traditional "inverted-T" shaped metal bookends or the heavy-weight molded or cast two-piece bookends.

Another disadvantage of traditional bookends is that the materials contained are not resting above the surface upon which they are placed and may be subject to soiling should the surface upon which the contained items rest be contaminated as in the case of a spilled liquid.

Other items have been devised such as holders of napkins, U.S. Pat. No. 4,874,099, or remote control units, U.S. Pat. No. 4,856,658. Both also claim other uses extending to the applications of holding books and other "office" type materials.

In the case of the Napkin Holder, identical end units show opposing tongues that slide through a channel and interlock by means of opposed-surface transverse ridges and relieved surfaces. The napkins exert an outward lateral force against each support panel which forces the engagement between guide channel and tongue, interlocking the transverse ridges of the slot and transverse ridges of the tongue. Additionally, the tongues extend out from the upright ends when the two identical interlocking slidable end units are in close adjustment. The compression of the contained napkins will also result in difficulty in removing a single item without extracting or disturbing the other napkins.

The Remote Control Holder, with the object of providing an adjustable holder to accomplish a snug fit which prevents the extraction of the remote control device and which allows for the assembly of a plurality of said holders, shows a rack of teeth forming a platform surface. To function, it relies upon a compressible cushion material affixed to the inside facing surface of the upright ends that provides the tension necessary to protect and hold the contained remote control inside of the device and secondly, the compression material in combination with the held remote control device exerts a lateral pressure to the resilient rack teeth to prevent separation of the Remote Control Holder. The effect is a tight joining of the resilient rack teeth angle member shoulders creating a binding pressure that holds the remote control device snugly and the device together. This approach is not suitable for the holding of books, files and other items that may be subject to frequent extraction and replacement. The base legs of the Remote Control Holder are designed so that one leg fits into a recess of the other end unit's leg to form a flat platform between the ends. The non-receptacle leg does not rest on the same plane as the receptacle leg. This invention speaks to the need for a holder that is portable and hand held that will not disassemble while the user manipulates the buttons of the remote control device. Additionally, platform extensions are attached by means of a sliding through-dovetail joint.

The reliance upon complicated secondary locking mechanisms to ensure space retention is a common element of prior art of indexed locking devices.

Both of the above referenced inventions state in their patent documents that the lateral pressure exerted by the materials being contained contribute significantly to the functionality of the devices.

The applications of various interlocking or opposed interlocking surface devices have not been applied specifically to bookend type containment holders, nor in such a way as to use the downward pressure created by the weight of the contained materials and the thickness of the platform in combination with the base indexing patten to create a binding action thus functioning as the means to maintain the fixed space. In the case of the Remote Control Holder and the Napkin Holder, it is the lateral pressure against the device side or upright members which engage the interlocking means of the devices, thus providing for the affixing of space. Neither claim nor show a reliance upon the weight of the materials contained or a continuous underlying platform that rests on a common plane whose thickness in combination with an indexing pattern assists in the functionality of the holders.

SUMMARY OF THE INVENTION

Accordingly, several objects and advantages of my invention are to provide a solution to containing bound volumes and other materials in such a way the allotted shelf space is both flexible and fixed; the removing or replacing of materials is easy due to the bookends not expanding or contracting but maintaining their original dimension as adjusted relative to the space between the end units, yet the area of containment may easily be altered to meet changing requirements; also that the bookends do not extend beyond the upright ends thus do not create an unusable space outside of the containment area; the device does not rely upon friction or leverage-resistance or compression or the weight of the device itself for functionality; and that the bookends provide a resting platform above the shelf or desk surface that protects the contained materials from soiling, as in the case liquid spillage damage; and that the containment space can be altered through the use of base extenders. When assembled it is easy for the user to slide the assembled unit to a new resting place on the table, shelf or desk surface without removing the contained materials or altering the space allotted for containment.

Further objects and advantages of my invention will become apparent from consideration of the drawings and ensuing description of it.

LIST OF NUMERAL REFERENCES

Figure 1:
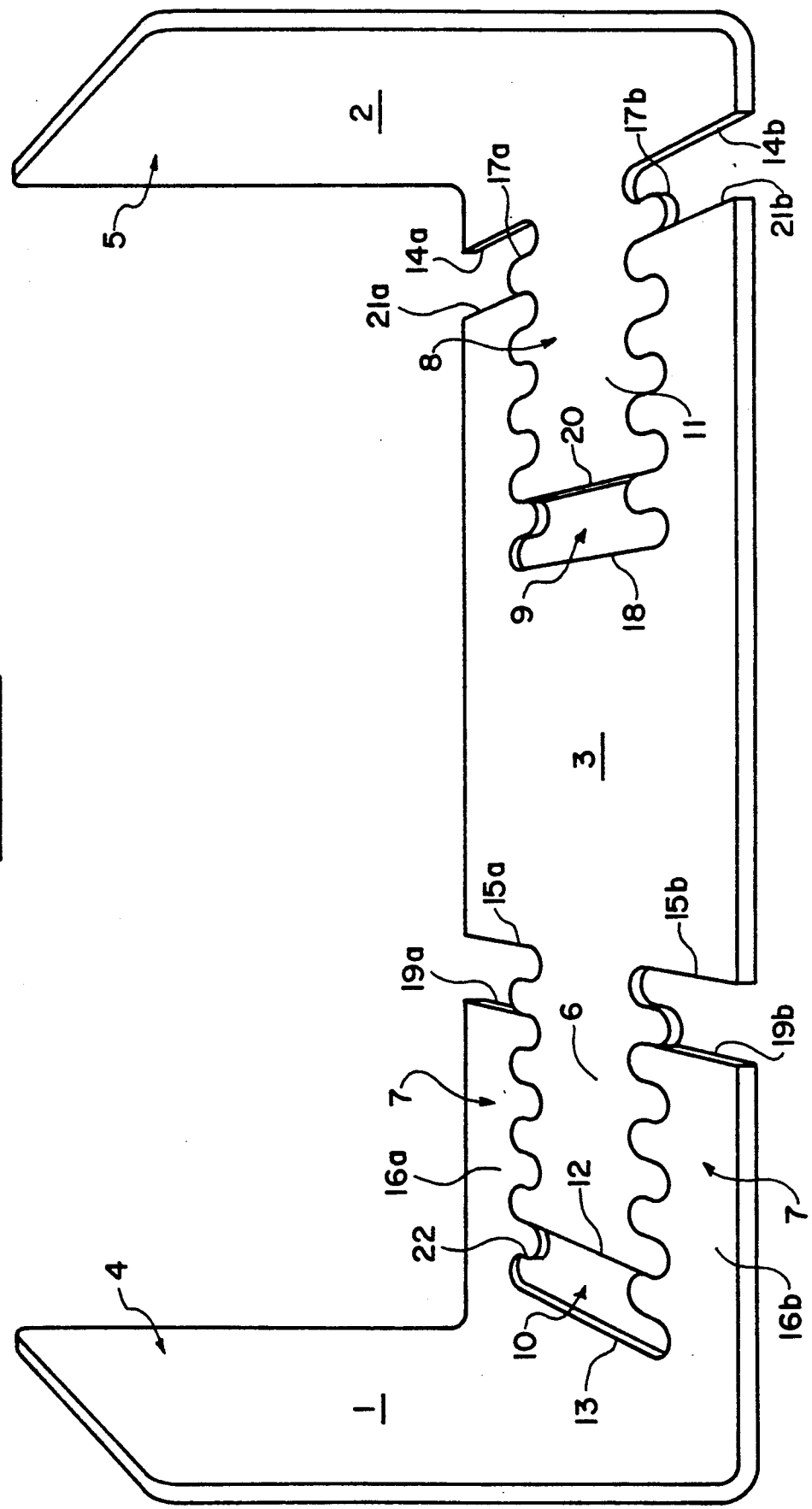
FIG. 1 is a perspective view of the female end section, the base extender and the male end section.

Female Section References:
1. end unit
4. upright
7. base platform
10. opening
13. opening stop
16. base fingers—(a) and (b)
19. fingers stops—(a) and (b)
22. opening sides Male Section References:
2. end unit
5. upright
8. base platform
11. base tongue
14. tongue shoulders—(a) and (b)
17. tongue sides—(a) and (b)
20. tongue stop Extender Section References:
3. base extender
6. tongue
9. opening
12. tongue stop
15. tongue shoulders—(a) and (b)
18. opening stop
21. finger stops—(a) and (b)

DETAILED DESCRIPTION OF A PREFERRED EMBODIMENT

As shown in FIG. 1 the Interlocking-Continuous Base Bookends of the present invention are comprised of a female 1 and a male 2 end unit and an optional base extender(s) 3. The optional base extender 3 may be engaged in multiples to increase the shelf containment capacity of the end section bookend components.

Figure 2:
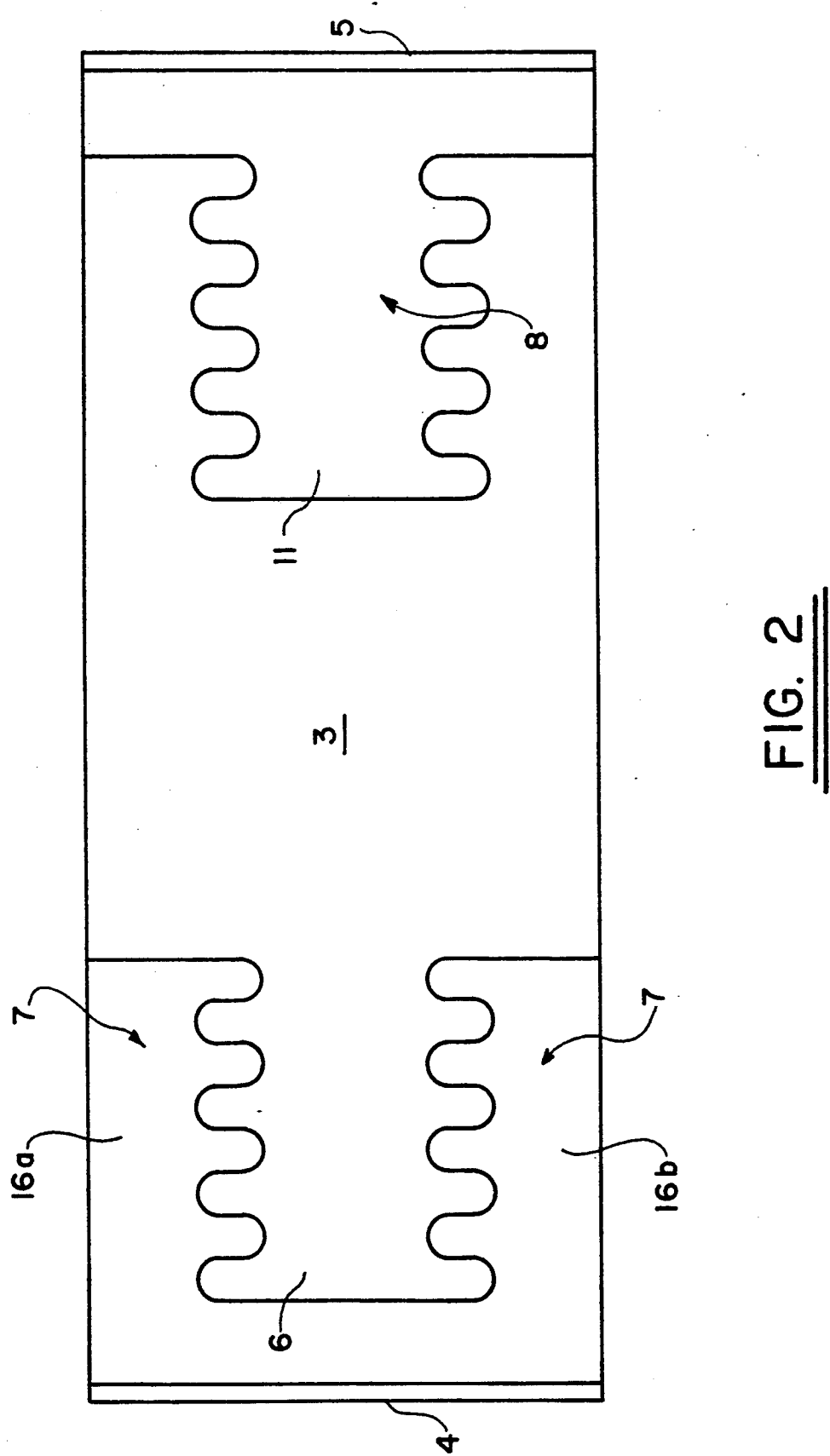
FIG. 2 is a top view showing one embodiment the interlocking male and female base and interlocking base extender in alignment.

The female 1 and male 2 end sections are "L" shaped, each having an upright end panel 4, 5 and a base platform 7, 8, respectively. The female base 7 and male base 8 sections, by means attached to the female 1 end upright 4 and the male 2 end upright 4, extend under the containment space and interlock as shown in FIG. 2. The interlocking pattern shown in FIG. 2 on the inside edges of the female section base 7 opening 10 is positioned to engage the interlocking pattern on the outside edges of the male section 2 base tongue 11.

The minimum holding capacity is determined by the distance between the female section 7 opening 10 stop 13 and the length of the female base 7 fingers 16a–b on either side of the female opening 10, and the male tongue 11 which is fashioned to the same length as the female section 1 opening's 10 depth. The shoulders 14a–b on either side of the male section 2 tongue 11 meet the female section base 7 fingers 16a–b stope 19a,b when the bookend set is adjusted to the minimum holding capacity. The end of the male base 8 section tongue 11 similarly meets the female opening 10 stop 13 when the bookend is adjusted to it's minimum holding capacity.

The base extender 3 is a component that when positioned between the female section 1 and the male section 2, enlarges the holding capacity of the bookend set by expanding the distance between the female 7 and male 8 base/platform sections when positioned between the two end units. The extender 3 is shaped to conform with the design properties of both the female section 1 base 7 and the male section 2 base 8. The extender 3, having both a tongue 6 and an opening 9, can minimally increase the holding capacity of the bookends by the length of the base extender 3 tongue 6 stop 12 to the base 7 female finger 16a–b stop 19a,b. The maximum holding size is achieved when the last matching interlock pattern at each end of one or more base extenders 3, are in adjustment with the last matching interlock pattern of the two end components 1, 2. In this illustration of one embodiment, the maximum containing width is the sum of the length of the male tongue 6 added to the depth of the female opening 9 less the space of the last interlock index contours of the end units 1, 2. Thus through the expansion capacity of the base extender(s) 3 the holding capacity of the two end units 1, 2 is significantly increased.

In the preferred embodiment of this interlocking-continuous base bookend, the evenly stepped interlock pattern is achieved by the female section fingers 16a–b being shaped along the opening 10 sides 22 with an evenly stepped round nosed fingers pattern as shown in FIG. 2. These indentions and protrusions are mirrored in reverse on the male section platform 8 tongue 11 side 17 so that the two base platforms 7, 8 fit flush and mesh to each other on the sides 17, 22 of the interior fitted plane [FIG. 2] forming a continuous platform base. When joined, all base components rest on a common plane. The tolerances between the interlocking shapes are close enough to inhibit lateral or vertical movement that would result in an uncoupling of the interlocking base.

In operation, the invention can be used to contain books, files, papers, music recordings on compact disks and long or short playing records, video tape or audio tape cartridges or other items as may be found in the home, office or school.

To adjust the holding width of the base, either the male section 2 or the female section 1 is raised, causing an uncoupling of the male base 8 and female base 5 sections. The sections are then moved away from or towards each other to the distance desired by the user and then reassembled by aligning the indexing shapes and allowing the base parts to settle onto the common resting plane on the shelf or table or desk surface. Should additional containment space be required, the user inserts one or more base extenders 3 in a like fashion to the adjustment of the female base platform 7 and male base platform 8 sections. The base sections may be placed as closely as the shoulders 14, 15 and stops 13, 19, 20, 12, 18, 21 allow or as far apart as the last interlock shape allows while maintaining the union of the various parts. The materials, contained by virtue of their own weight and the resulting downward pressure and particularly by the binding action of the close tolerances of the interlocking shapes working in conjunction with the thickness of the base platform, hold the various base sections in place and inhibit the disjoining of the base sections. The tolerances between the indexing shapes allows for ease of adjustment but when the assembled unit is subjected to movement, the close tolerances cause the sections to bind and thereby inhibit the assembled sections' disassembly. This contributes to the integrity of the base stability.

Thus the reader will see that the Interlocking-Continuous Base Bookends invention is a novel, practical, innovative and economical approach to containing a variety of materials, resulting in a containment space that is fixed in dimension yet adjustable and may be used by persons of any age. In a preferred embodiment, the invention is molded out of clear acrylic which allows a book cover or contained item to be displayed, therefore opening up the possible application of the invention as a retail display-fixture. Also it could be a cost effective packaging-device alternative to slip cases that will enhance the perception of value—added to book sets. The holder could be made of colored or clear plastics, wood, metal or other materials as deemed suitable. The container can be manufactured in various dimensions appropriate to the materials to be contained.

The continuous base platform raises the contained materials above the shelf or table or desk surface thus protecting the contained materials from accidental spills of liquids or other soiling agents thus lending it a practicality in the shop, office, school, home and laboratory settings. Providing for limitless extensions of the base, the device also allows for flexible spacial adjustment that are fixed by virtue of the downward weight of the contained materials in combination with the interlocking shapes.

While the above descriptions contain many specificities, these should not be construed as limitations on the scope of the invention, but rather as an exemplification of one preferred embodiment thereof. Many other variations are possible. For example the interlocking indexed pattern may vary in shape and size which could vary the distance of incremental adjustment. The end panels may be painted or etched or shaped to replicate logos, emblems or other ornamental graphics. Accordingly, the scope of the invention should be determined not by the embodiment(s) illustrated, but by the appended claims and their legal equivalents.

I claim:

1. An interlocking continuous base bookend device comprising:
   a) a first and second upright end unit each having a longitudinal base leg of uniform thickness so that when joined they form a level base;
   b) said first upright end unit longitudinal base leg having a female cut-out opening surrounded on three sides by oppositely positioned base fingers and a base opening stop between said fingers at said first upright end unit;
   c) said second upright end unit longitudinal base leg having a male base-tongue;
   d) said first upright female longitudinal base leg cut-out opening fashioned to receive said longitudinal leg male base-tongue so that a continuous base is formed; and
   e) interlocking means for releasably coupling and readjusting the width of said continuous base comprising shapes formed along the outside edges of said longitudinal leg male base-tongue conformed to releasably correspond with shapes formed along the adjacent inside edges of said female longitudinal base leg cut-out opening so that said upright end units are adjustably joined by meshing said shapes and the width of said device fixed.

2. The device of claim 1 further comprising a base extender support means of the same uniform thickness as said two longitudinal base legs comprising:
   a) an extender female opening on one end identical to the female cut-out opening of said first upright end unit longitudinal base leg;
   b) an extender male base-tongue identical to said second longitudinal leg with a male base-tongue;
   c) a connecting platform between said extender female cut-out opening and said extender male base-tongue; and
   d) said extender female cut-out opening and said extender male base-tongue formed with conforming shapes so that said base extender support means is removably connectable to said upright end units and forms an extension of said continuous base when said base extender support means is positioned between said two upright end units thereby increasing the holding width of said device.

* * * * *